No. 613,298. Patented Nov. 1, 1898.
M. PALMTAG.
RUNNER FOR VEHICLES.
(Application filed Dec. 22, 1897.)
(No Model.)
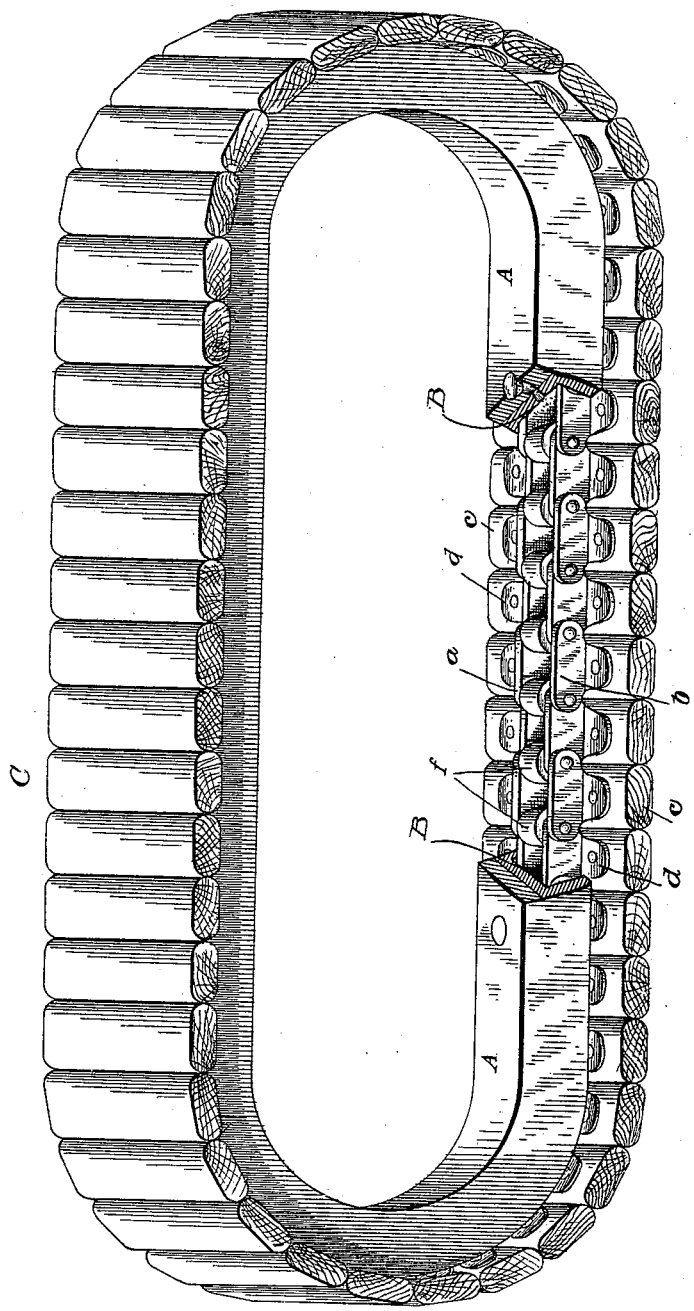
Witnesses:
Fenton S. Belt.
Inventor:
M. Palmtag,
by H. B. Willson & Co.
Attorneys.

UNITED STATES PATENT OFFICE.

MARTIN PALMTAG, OF NEW WHATCOM, WASHINGTON.

RUNNER FOR VEHICLES.

SPECIFICATION forming part of Letters Patent No. 613,298, dated November 1, 1898.

Application filed December 22, 1897. Serial No. 662,973. (No model.)

*To all whom it may concern:*

Be it known that I, MARTIN PALMTAG, a citizen of the United States, residing at New Whatcom, in the county of Whatcom and State of Washington, have invented certain new and useful Improvements in Runners for Vehicles, &c.; and I do declare the following to be a full, clear, and exact description of the invention, such as will enable others skilled in the art to which it appertains to make and use the same.

My invention has relation to runners for vehicles, traction machinery, power-sleds, &c.; and the object of the invention is to provide a track of sufficient width to allow the vehicle to pass over any kind of ground, swamp, snow, &c., with ease by increasing the traction-surface to create a traction that will always lie stationary, thereby avoiding all tendency to slip.

The ordinary wagon or traction wheel offers but little resisting-surface to the ground.

The object of this invention is the creation of more resistance or friction between the runners and the ground for the propulsion of the vehicle.

In an application filed simultaneously herewith I have shown these runners for vehicles or machinery wherein the power derived for driving it is carried by the vehicle or machinery or is applied to it by mechanical means. In this application the power for drawing or driving the vehicle is located outside of and away from the vehicle and may be horse or other animal power.

With this object in view the invention consists of certain features of construction and combination of parts, which will be hereinafter fully described and claimed.

In the accompanying drawing I have illustrated my invention in a large perspective view, partly in section.

A is the rim of the runner, preferably made of wood and of elliptical form, and B is the way, preferably formed of angle-iron and secured to the exterior surface of the track and entirely surrounding the same.

C denotes the end of the track, which consists of two parallel chains $a$ and $b$, each link of which is provided with a lug $d$, that is bolted or riveted to the traction-bars $c$. The pivots of the links of one chain serve as a pivot for the links of the other chain, and between the links of the two chains, upon said pivots, are journaled rollers $f$. The track is placed upon the rim, and the chains lie between the flanges of the way, and the rollers contact with the base of the way and have a rolling engagement therewith.

As my invention is applicable to all forms of vehicles and agricultural machinery, I have not shown the framework of such vehicle or machinery, as it is thought the same will not be deemed necessary.

It will of course be understood that if an increased traction is desired the runners at each side of the vehicle or agricultural machinery may be duplicated.

Having thus described my invention, what I claim, and desire to secure by Letters Patent, is—

1. A runner for the purpose described, consisting of a loop-shaped rim, a guideway secured to said rim, a track consisting of parallel chains, the links of which are pivoted together and are provided with ears, traction-bars secured to said ears, and rollers journaled to and between said links, substantially as set forth.

2. A runner for the purpose described, consisting of a loop-shaped rim, a guideway preferably flanged, secured to said rim, a track consisting of parallel chains, the links of which are pivoted together, and rollers journaled to and between said links and contacting with said guideway, the links of the chain provided with ears, and traction-bars secured to said ears, substantially as set forth.

In testimony whereof I hereunto affix my signature in presence of two witnesses.

MARTIN PALMTAG.

Witnesses:
ELLIOTT STEWART,
A. T. FAZEN.